United States Patent [19]

Levien

[11] Patent Number: 5,331,429
[45] Date of Patent: Jul. 19, 1994

[54] DIGITAL GENERATION OF HALFTONE IMAGES WITH ERROR DIFFUSION AND FREQUENCY MATCHED PERIODIC SCREEN RULINGS

[76] Inventor: Raphael L. Levien, P.O. Box 31, McDowell, Va. 24458

[21] Appl. No.: 832,555

[22] Filed: Feb. 7, 1992

[51] Int. Cl.⁵ .............................................. H04N 1/40
[52] U.S. Cl. ..................................... 358/456; 358/455; 358/445
[58] Field of Search ............... 358/456, 455, 457, 447, 358/445, 454, 458, 459, 428, 463

[56] References Cited

U.S. PATENT DOCUMENTS

| | | |
|---|---|---|
| 4,051,536 | 9/1977 | Roetling . |
| 4,245,258 | 1/1981 | Holladay . |
| 4,246,614 | 1/1981 | Knox . |
| 4,633,327 | 12/1986 | Roetling . |
| 4,654,721 | 3/1987 | Goertzel et al. . |
| 4,673,971 | 6/1987 | Ikuta et al. . |
| 4,700,235 | 10/1987 | Gall . |
| 4,821,109 | 4/1989 | Roe . |
| 4,823,189 | 4/1989 | Haines et al. . |
| 4,916,545 | 4/1990 | Granger . |
| 4,918,622 | 4/1990 | Granger et al. . |
| 4,924,301 | 5/1990 | Surbrook . |
| 4,977,458 | 12/1990 | Granger et al. . |
| 4,985,779 | 1/1991 | Gall . |
| 5,051,844 | 9/1991 | Sullivan et al. ........... 358/456 |
| 5,053,887 | 10/1991 | Thompson . |
| 5,055,942 | 10/1991 | Levien . |
| 5,070,413 | 12/1991 | Sullivan et al. ........... 358/456 |
| 5,189,529 | 2/1993 | Ishiwata et al. ........... 358/448 |

FOREIGN PATENT DOCUMENTS

454273A2 10/1991 European Pat. Off. .
454274A2 10/1991 European Pat. Off. .
454275A2 10/1991 European Pat. Off. .
454276A2 10/1991 European Pat. Off. .
454277A2 10/1991 European Pat. Off. .

OTHER PUBLICATIONS

"On the Error Diffusion Technique for Electronic Halftoning", C. Billotet-Hoffmann et al., Physics Dept., Univ. of Essen, Germany, Proceedings of the SID, 1983, vol. 24/3.

"An Adaptive Algorithm for Spatial Greyscale", Robert W. Floyd and Louis Steinberg, Proceeding of the SID, vol. 17/2, Second Quarter 1976.

Primary Examiner—Edward L. Coles, Sr.
Assistant Examiner—Madeleine Nguyen

[57] ABSTRACT

An error diffusion, or adaptive dither method of producing halftone images includes an injected periodic screen pattern. The frequency of error diffusion dot formation is tuned to roughly match the frequency of the periodic screen pattern by adjustment of a hysteresis constant so that dot formation is phase and frequency locked to the phase and frequency of the periodic screen pattern. The resulting halftone, consisting of an orderly array of dots placed on a grid pattern at substantially the same angle and screen ruling as the periodic screen pattern, combines the advantages of both traditional screening such as precisely angled screens, and the advantages of error diffusion screening, such as better rejection of both internal and external moire artifacts. Any type of screen generation technique such as rational tangent, irrational tangent and rational supercell techniques can be used as a source of the periodic screen pattern.

34 Claims, 8 Drawing Sheets

SEQUENCER MODULE (64) OUTPUTS

| PHASE | ADDRESS | PULSES | A | B | C | D | E |
|---|---|---|---|---|---|---|---|
| 1 | 0 | * | | | | | |
| 1 | 1 | * | | | | | |
| ... | | | | | | | |
| 1 | N-1 | * | | | | | |
| 2 | 0 | | | * | | | |
| 2 | 0 | | | | * | | |
| 2 | 0 | | | | | * | |
| 2 | 1 | | | * | | | |
| 2 | 1 | | | | * | | |
| 2 | 1 | | | | | * | |
| ... | | | | | | | |
| 2 | N-1 | | | * | | | |
| 2 | N-1 | | | | * | | |
| 2 | N-1 | | | | | * | |
| 3 | 0 | | | | | | * |
| 3 | 1 | | | | | | * |
| ... | | | | | | | |
| 3 | N-1 | | | | | | * |
| 1 | 0 | * | | | | | |
| 1 | 1 | * | | | | | |
| ... | | | | | | | |
| 1 | N-1 | * | | | | | |
| 2 | N-1 | | | * | | | |
| 2 | N-1 | | | | * | | |
| 2 | N-1 | | | | | * | |
| 2 | N-2 | | | * | | | |
| 2 | N-2 | | | | * | | |
| 2 | N-2 | | | | | * | |
| ... | | | | | | | |
| 2 | 0 | | | * | | | |
| 2 | 0 | | | | * | | |
| 2 | 0 | | | | | * | |
| 3 | 0 | | | | | | * |
| 3 | 1 | | | | | | * |
| ... | | | | | | | |
| 3 | N-1 | | | | | | * |

FIG. 7

DIGITAL GENERATION OF HALFTONE IMAGES WITH ERROR DIFFUSION AND FREQUENCY MATCHED PERIODIC SCREEN RULINGS

FIELD OF THE INVENTION

The present invention relates to halftone screening of images for photographic reproduction, and more particularly the present invention relates to an error diffusion method of generating screened halftones images in which the frequency of halftone dot generation is locked to a periodic screen pattern.

BACKGROUND OF THE INVENTION

Images are typically stored in a memory representing tone values for each image pixel of the original image. For a black and white image, the stored image pixels represent the gray scale value corresponding to each pixel. For a color image, each color plane is stored as an array of image pixels each representing the tone value for each pixel of the image in each respective color plane. For example, if each of the pixels of a black and white image is represented by a 8 bit digital word, then the tone value for a given image pixel may be one of 256 values between the black level and the white level.

Continuous tone images do not print well on most printing devices where typically the absence or presence of the ink (or other marking indicia) on the paper is used to represent the printed image. In order to represent halftones (shades between the presence or absence of the printed ink), the original image is screened to produce a pattern, such as variable size dots which appear to the human eye as a halftone image.

In order to prepare a photograph for printing, it is first necessary to perform the step of halftone screening, which converts the continuous gray shades of the original into halftone dots of varying size and shape. Typically, these halftone dots are arranged on a regular grid of approximately 100 dots per inch. This spatial frequency is known as the screen ruling. Thus, one square inch of the final printed photograph will be composed of approximately 10,000 dots.

SCREEN GENERATION TO PRODUCE HALFTONES

Screening to produce halftone images is well known. The screen consists of an array of dots, or halftone cells, each of which represents one section of continuous tone in the original image as a single dot of variable size and shape. A halftone cell, in turn, consists of an array of smaller screen pixels, or samples, each having individual values against which the input pixels derived from the original image will be compared. The individual values of the smaller screen pixels, or samples, of the repeating halftone cell which form the variable dots is referred to as a spot function.

The halftone screening step consists of a screen pattern generating step, and a comparison step between the input image and the screen pattern. The screen is usually stored as a fairly small pattern that repeats itself or is repeatedly generated by programming. At any point where the original image is greater than the screen pattern, the output is marked. At any point where the image is not greater than the screen pattern, the output is not marked. In other words, if the value of the image pixel is greater than corresponding value of the screen cell, a mark (output pixel) is generated by the marking engine, whereas if the value of the image pixel is less or equal to the screen cell value, then no mark is generated by the marking engine, or vice versa. In this way, the final screened image, composed of dots, is produced. It should be understood that there are two levels of dots: the output pixels from the marking engine, which at any point can be either black or white, but not an intermediate gray level (such devices include thermal transfer facsimile machines, laser electrostatic, and ink jet printers), and the variable size halftone dots which are composed of a plurality of adjacent output pixels of all one color.

In color printing, there are four separate steps of halftone screening, one each for the cyan, magenta, yellow, and black inks. It is advantageous, in order to minimize objectionable Moire patterns, to angle the halftone grid differently for each of the four planes. For example, the most common practice is to angle the cyan dots by 15 degrees, magenta by 75 degrees, yellow by 0 (or 90) degrees, and black by 45 degrees. If these angles are adhered to precisely, as well as the screen ruling being precisely identical for all four planes, then optimum results are achieved.

Precise screen angles are achieved in photomechanical systems by rotating the photographic screen carrier. When the image is processed electronically, and the screened image is to be produced by a digital raster scan recording device, screen generation techniques for producing both rational screens (0 and 45 degrees), and irrational screens (15 and 75 degrees), as well as irrational screen rulings are known.

ERROR DIFFUSION TO PRODUCE HALFTONES

Error diffusion, or adaptive dither techniques for halftone image generation are known. In error diffusion, the error introduced by marking each individual output pixel white or black, as compared to the desired image pixel grey shade, is diffused to neighboring output pixels. Error diffusion does not produce the traditional dot pattern of halftone screens. In some systems, grey shades are simulated using very small dots which are too fine to be well reproduced by most marking or reproduction devices. In U.S. Pat. No. 5,055,942 to the present inventor, an error diffusion technique is disclosed in which the coarseness of the halftone is controllable by adjustment of a hysteresis constant. Although image coarseness (i.e., the dot size, and therefore the dot frequency) is adjustable, the resulting halftones do not have a fixed periodic dot frequency (screen ruling) for all gray shade values, but instead tend to result in halftones having somewhat different size dots within a range of different periodic dot frequencies.

A traditional dot structure reproduces extremely well on many printing systems. Certain characteristics of the printing system, such as dot gain, do not adversely affect the quality of a traditional dot structure halftone. Dot gain is the tendency of the printing system to print larger dots than indicated by the marking signals, i.e. output of the screening subsystem. Dots of different sizes are affected differently. For example, it is common for small dots to be relatively more affected than larger dots.

As indicated, an error diffusion halftone produced by U.S. Pat. No. 5,055,942 is composed of many different dot sizes. When printed using a printing system with dot gain, the small dots are relatively more affected. Thus, local regions containing a preponderance of small dots appear relatively darker than local regions containing mostly large dots. The result is an increase in visible graininess, or mottling. When a halftone of traditional uniform dot structure is printed on a printing system with dot gain, however, size of the printed dots is much more consistent. All dots are approximately the same size, and are therefore equally affected by the dot gain. The smooth rendition of tone, without grain or mottling, is preserved.

With regard to color reproduction, halftone dot patterns produced by error diffusion techniques are not at the precise angles necessary for best color reproduction. It would be desirable to produce uniform dots, and for color printing it would be desirable to have precise control of the angles, particularly irrational angles, in an error diffusion halftone.

SUMMARY OF THE INVENTION

The present invention consists of a modification to an error diffusion screening method in which a periodic screen pattern is introduced into the error diffusion process. The frequency of error diffusion dot formation is tuned by adjustment of the hysteresis constant to roughly match the frequency of the periodic screen pattern. Then, the dot formation process is phase locked to the phase of the periodic screen pattern. The present invention produces a halftone consisting of dots placed on a grid pattern at exactly the same frequency as the periodic screen pattern. The resulting halftone combines advantages of both traditional screening and error diffusion screening. The final halftone visually resembles a traditional halftone, rather than an error diffusion pattern, in that it comprises an orderly array of dots, at any desired periodic spacing.

The improvement consists of adding a periodic screen pattern to the error diffusion process immediately before the thresholding step which controls dot formation, by switching from white to black, or from black to white. The added periodic screen pattern corresponds to the desired screen ruling and screen angle. Dot pattern generation by error diffusion is phase locked to the periodic screen pattern by varying the threshold level to which the accumulated error is compared in accordance with a function having the same period as the periodic screen pattern.

Any type of screen generation technique can be used as the source of the periodic screen pattern. The diversity of screen rulings and screen angles is determined by the exact nature of the screen pattern generator. Rational tangent (as in U.S. Pat. No. 4,149,194 to Holladay), traditional irrational tangent (U.S. Pat. No. 4,499,489 to Gall and U.S. Pat. No. 4,350,996 to Rosenfeld), and rational supercell techniques (European patent document 0 427 380 A2 to Schiller) can be used as a source of the periodic screen pattern. The preferred embodiment for the screen pattern generator for use in conjunction with the present invention is the screen generation technique disclosed in U.S. Ser. No. 753,893, entitled "SCREEN GENERATION FOR HALFTONE SCREENING OF IMAGES", combined with a screen cell described in U.S. Ser. No. 814,880, entitled "METHOD AND APPARATUS FOR SCREENING OF IMAGES USING GRAYSCALE ERROR DIFFUSION" both of which pending patent applications are to the same inventor as in the present invention.

Traditional halftones are plagued by the problem of external moire. When the original image contains very little high frequency content (i.e. detail), it is reproduced faithfully in traditional halftones. However, when the original image contains significant detail, the frequencies of the detail interfere with the frequency of the screen pattern. When the frequencies are close, the result is a very highly visible low frequency pattern. This type of artifact is termed external moire. The present invention is highly successful in suppressing external moire because each pixel contributes equally to the error calculation, which in turn is continually monitored against the resulting halftone. If a discrepancy were to occur, it would be counteracted in successive pixels. In a traditional halftone, by contrast, pixels near a dot edge have significantly more effect on the final halftone than pixels near a dot center, which have almost no effect at all on the final halftone. Suppression of external moire has the additional advantage that grain noise such as from film grain, is significantly reduced in the final halftone.

However, in digital raster scan screening systems, there is another source of artifacts, which is termed internal moire, that results from the interaction between the screen and the finite resolution of the output image forming device. Internal moire occurs only in digital raster scan screening systems, whereas external moire occurs in all screening systems, including photomechanical. Internal moire artifacts are particularly objectionable when using fine screen rulings, low output resolutions, or a combination of both. As a result, it is typical to use a 3500 dot per inch (dpi) output resolution to minimize internal moire artifacts and obtain a quality image. It would be desirable to be able to obtain a quality image with a printer having fewer dots per inch (e.g. 600 api), since a 600 dpi printer is both less expensive, and results in reduced total image processing time, because fewer data points need be processed corresponding to each inch of the final halftone image, as compared to a 3500 dpi printer.

The advantage of using error diffusion in the present invention is better rejection of both internal and external moire artifacts. Additional advantages appear when a multicolor image is formed using multiple separate halftone images, one for each color plane. If, when using the present invention, the source of periodic screen patterns can be controlled to produce screen patterns of consistent screen ruling, and angles spaced exactly 30 degrees apart, then the resulting multicolor image exhibits a traditional rosette pattern, well known and desired in color printing. A multicolor image formed by error diffusion halftones alone, has a somewhat random pattern of overlapping colored dots, and the final halftone may exhibit a strong degree of color variation, or mottling. The mottling effect is particularly strong when opaque, i.e. not transparent, colored inks are used.

The present invention is highly suitable for use with very low screening ratios (output resolution divided by screen ruling), in the range of 3 or 4 for example. A traditional error diffusion method of producing halftones exhibits a strong degree of internal moire at such a screen ratio, which the present invention is highly effective in suppressing. When used with rational tangent angles, the internal moire takes the form of quantization of tones, rather than a periodic artifact pattern. The present invention is equally suitable for use with rational tangent angles.

The present invention can be practiced with any type of source of screen pattern, including irrational tangent angled screens desirable for multicolor printing. The method of the present invention is simultaneously capable both of being used with any type of screening and of suppressing both internal and external moire. The present invention is particularly advantageous for use with small screening ratios, specifically in the range of 3 through 8, thereby making it highly suited to the production of extremely high quality multicolor images on low resolution color printing devices.

BRIEF DESCRIPTION OF THE DRAWINGS

FIG. 7 is a tabulation of the signals produced by the sequencer module.

DETAILED DESCRIPTION

Figure 1:
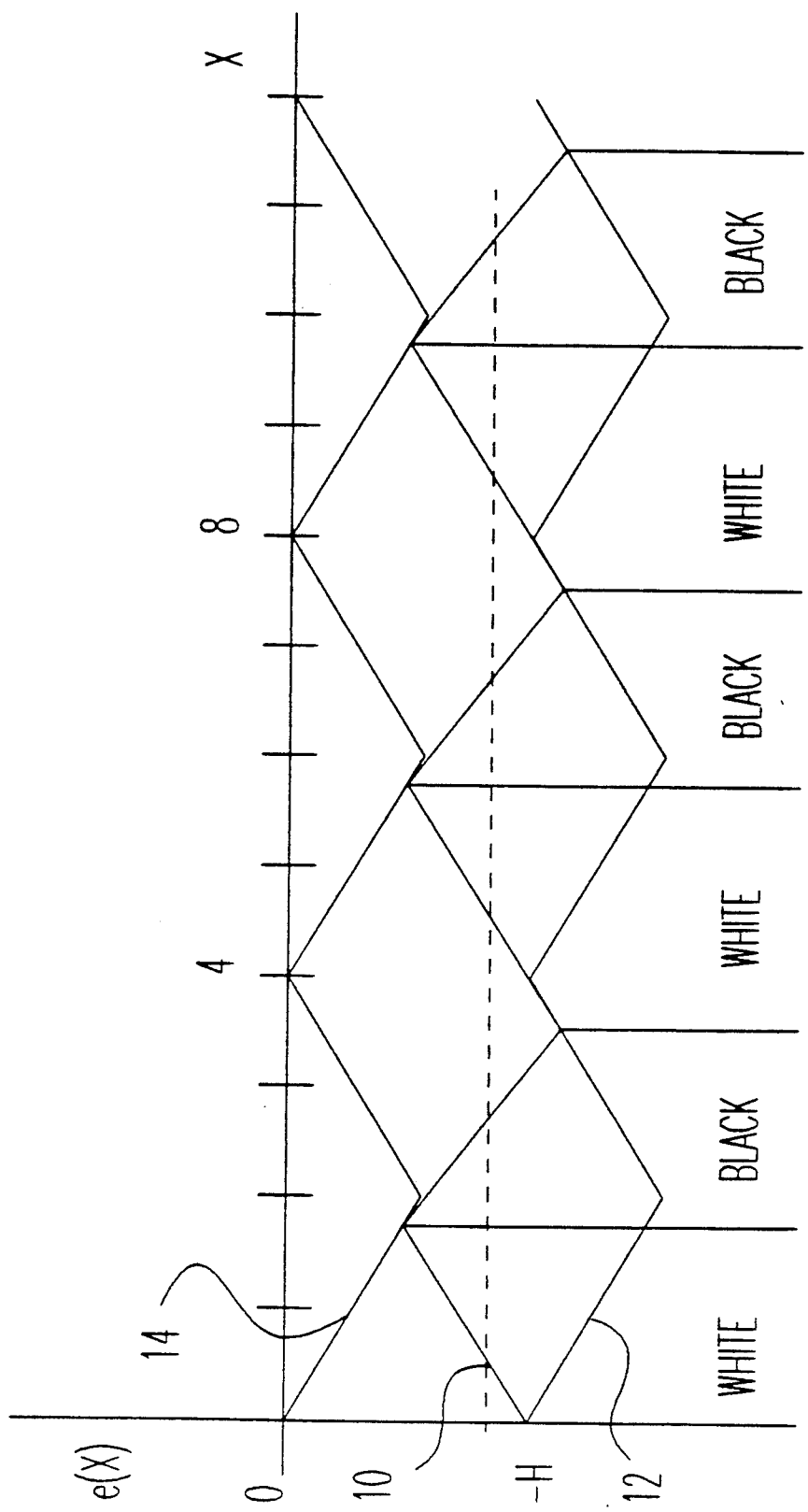
FIG. 1 is an error curve between positive and negative threshold values including a periodic screen pattern, shown for a constant gray shade input from a scanner and corresponding black and white outputs.

In the present invention, a halftone consisting of a periodic grid of dots, positioned exactly according to the injected screen pattern. A good quality image is obtained when the screening ratio falls within the range of about 3 to 4. The hysteresis factor H, which controls the dot size or image coarseness, is tuned to an optimum value for the best quality. An optimum value for H is obtained when the average dot size is comparable to dot sizes in a halftone of the desired screen ruling.

While the invention applies to a two dimensional (x, y) screening process, for purposes of simplifying its illustration, a one dimensional case (x) is assumed. Inputs from the scanning device are represented as i(x). Assume that i(x) is a fraction between 0 and 1 having 256 possible values, with each value representing one of 256 gray shades (e.g., 0 corresponding to white and 255 corresponding to black). For convenience, the gray shades can be represented by 256 integer values ranging from zero (white) to a full scale value, fs, of 255 (black). Of course, the representations of black and white are arbitrary and can be reversed. Recognizing that the marking device can only produce black and white output pixels, further assume that at any point x, the output of the screening device, O(x), is a 0 if the marking device is to produce a white pixel at point x and O(x)=1 if the marking device is to produce a black pixel at point x. If i(x) is scaled to be an integer between 0 and 255, O(x)=0 corresponds to i(x)=0 while O(x)=1 corresponds to i(x)=255. Since i(x) can have any value gray shade value between 0 and 255, it is necessary for the screening device to determine the size and number of black and white output pixels forming appropriately sized black and White halftone dots required to produce the desired shade of gray read by the scanning device at i(x).

The number and size of black and white halftone dots for a given gray shade can be determined, according to the invention, from a recursive relation that considers the effect of the previous output and a secondary error, which itself is a function of the previous error, the previous output and the current input. Assume that fs represents full scale as discussed above and that e(x) represents an error between inputs i(x) and outputs O(x). In order to obtain a shade of gray at the output that is equal to the shade at the input, it is desired that the average of the differences between the inputs i(x) and outputs O(x), the error, approach zero. Since i(x) can be any integer between zero and 255 while O(x) can take on only the discrete values zero and one, mathematical relationships between i(x) and O(x) must include a scaling for O(x). Thus, on average, the difference between i(x) and the product of O(x) and fs representing full scale must approach zero to achieve the desired effect.

Assume e(x) defines an error and e'(x) defines a secondary error as:

$$e(x) = e'(x) - fs * O(x)$$
$$e'(x) = e(x-1) + i(x)$$

Then, for example, if $x = 3$, $$\begin{aligned}e(3) &= e'(3) - fs * O(3) \\ &= e(3-1) + i(3) - fs * O(3) \\ &= e(2) + i(3) - fs * O(3)\end{aligned}$$

where $$\begin{aligned}e(2) &= e'(2) - fs * O(2) \\ &= e(2-1) + i(2) - fs * O(2) \\ &= e(1) + i(2) - fs * O(2)\end{aligned}$$

Therefore, $$e(3) = e(1) + i(2) - fs*O(2) + i(3) - fs*O(3)$$

where $$\begin{aligned}e(1) &= e'(1) - fs * O(1) \\ &= e(1-1) + i(1) - fs * O(1) \\ &= e(0) + i(1) - fs * O(1)\end{aligned}$$

Therefore, $$e(3) = e(0) + i(1) - fs*O(1) + i(2) - fs*O(2) + i(3) - fs*O(3)$$

where $$\begin{aligned}e(0) &= e'(0) - fs * O(0) \\ &= e(0-1) + i(0) - fs * O(0)\end{aligned}$$

assuming $e(-1) = 0$, then $$e(0) = i(0) - fs * O(0)$$

Therefore, $$e(3) = i(0) - fs*O(0) + i(1) - fs*O(1) + i(2) - fs*O(2) + i(3) - fs*O(3)$$

Thus, $$e(3) = \sum_{j=0}^{3} i(j) - fs * O(j)$$

and generally,

-continued $$e(x) = \sum_{j=0}^{x} i(j) - f_s * O(j)$$

Now define the output from the screening device O(x) as follows:

$$O(x) = 1 \text{ if } e'(x) + H * O(x-1) + S(x) >= 0$$
$$= 0 \text{ if } e'(x) + H * O(x-1) + S(x) < 0$$

where H is a hysteresis constant which defines allowable excursion of the error around zero. In the present invention, a traditional dot pattern is formed by adding a periodic screen pattern, S(x), to the sum of the above error term plus the product of the above output term times the chosen hysteresis constant H. In other words, the allowable excursion is a triangular wave at the screening frequency shifted by the adjustable hysteresis constant H. In addition, H is adjusted so that the frequency of dot formation is approximately equal to the frequency of the frequency of the periodic screen pattern S(x).

Thus, as defined above, O(x) is a function of the secondary error e'(x) and the previous output, O(x−1). The secondary error e'(x) is a function of the previous error e(x−1) and the input i(x). As demonstrated above, the previous error is a function of the sums and differences between the inputs i(x) and the outputs O(x). As the summation equation above shows, if e(x) is maintained in the general range of zero, the output O(x) approximates the input i(x). The hysteresis constant defines an allowable excursion of the error around zero and thus represents the difference between the output and the input. Over an arbitrarily large number of points the average error, which is e(x) divided by the number of points, approximates zero. Thus, the output gray shade would be approximately equal to the input gray shade.

The effect of the hysteresis constant H is illustrated in the plots of e(x) versus x shown in FIG. 1. Assuming for simplicity a constant shade of gray input from the scanning device, all values of i(x) are equal. In FIG. 1, triangular wave 14 represents the upper threshold at which the output indicia (black mark or no mark) switches from white to black. The triangular wave 12 represents the lower threshold at which the output indicia switches from black to white. Curve 10 is the error term e(X) oscillating between the upper and lower thresholds. A first constant gray shade produces a ramp like error curve between the lower threshold 12 and the upper threshold 14. The positive slope of the ramp is i(x) and causes a single white halftone dot to be generated for all x where e(x) is between the lower and upper thresholds. Thus, if the positive slope of the ramp spans two points in the x direction, a single white halftone dot of size 2 is generated. When e(x) reaches the upper threshold 14, the inequality in the equation for O(x) flips and a single black halftone dot whose size corresponds to the number of points in the x direction spanned by the negative slope of the curve is generated. The negative slope of the ramp during black halftone dot generation is i(x)−1. It should be noted that the slope of the ramp is a function of the shade of gray. Thus, for a constant shade of gray halfway between white and black, the positive and negative slopes would be equal. For a lighter constant shade of gray the positive slope of the ramp would decrease, causing more white pixel output. It will be understood by those of ordinary skill that the above directions and slopes are arbitrary and could be reversed within the scope of the invention. The upper and lower thresholds 12 and 14 lock the frequency and phase of halftone dot formation to the frequency and phase of the periodic screen pattern S.

As described above, the hysteresis constant H affects the coarseness of the patterns formed by the screening device by influencing the size of the halftone dot produced as a plurality of adjacent output pixels marked by the marking device. A hysteresis constant value of zero corresponds to the finest possible screen. A hysteresis constant value of one times the value of full scale fs corresponds to a coarse screen. A typical value is 0.5 of full scale, fs, for a screening of medium coarseness. It should be noted however, that H can be any value which is not less than zero.

Figure 2A:
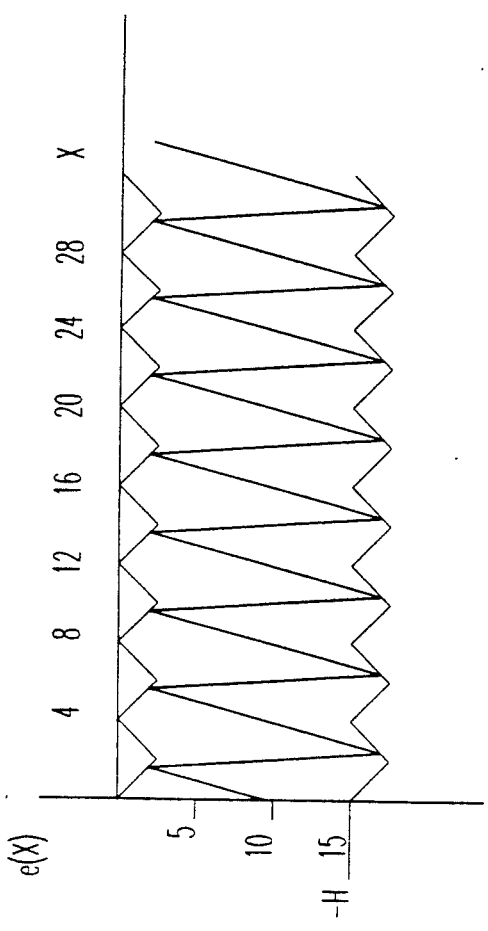
FIG. 2A shows an error curve similar to that of FIG. 1 showing more cycles of dot generation.
Figure 2B:
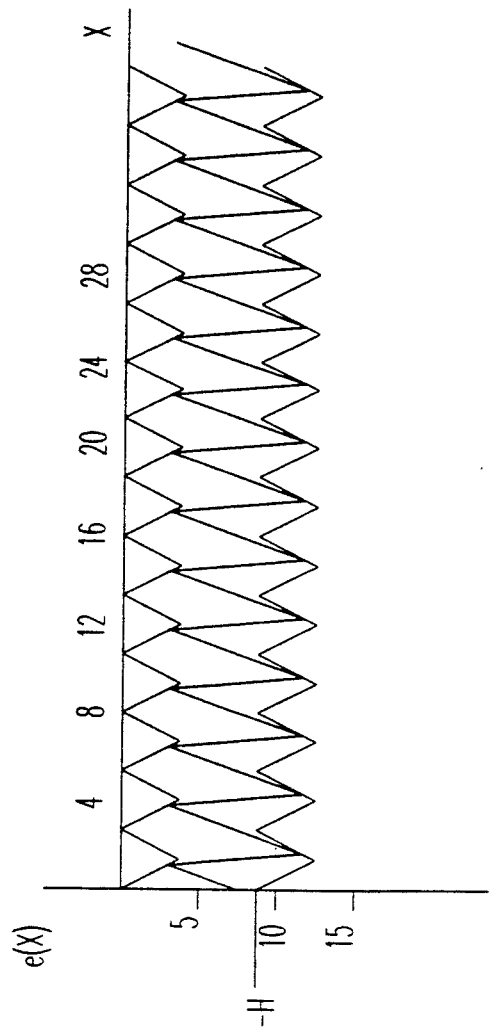
FIG. 2B shows an error curve similar to that of FIG. 2A with image dot formation coarseness tuned to accommodate higher screening frequency by using a smaller hysteresis value.

FIGS. 2A and 2B illustrate the effect of changing the hysteresis constant H in order to tune the frequency of halftone dot formation to roughly match the frequency of the periodic screen pattern S. FIG. 2B shows that, for the same constant gray shade assumed in FIG. 2A, a decrease in the value of H causes a decrease in the size of the white and black halftone dots produced, and a corresponding increase in the dot frequency. This is because as H decreases it requires a smaller traversal of the x axis to go up and down the ramp. Thus, for a given time period, greater number of transitions from black to white dots occurs in FIG. 2B, and the screened image produced in FIG. 2B is less coarse with smaller higher frequency dots as compared to FIG. 2A.

Figure 3:
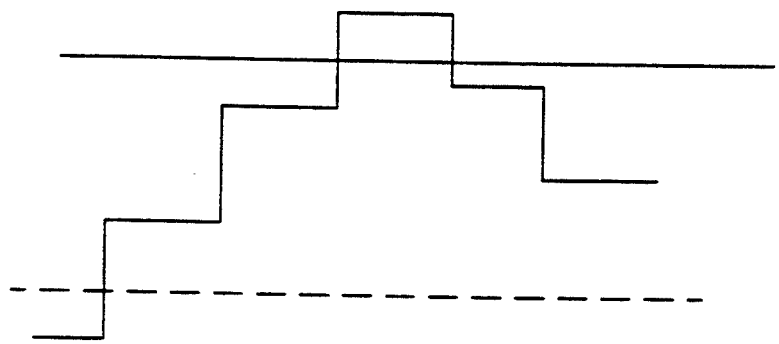
FIG. 3 illustrates the quantization effect of measuring discrete points.

While FIGS. 1, 2A, and 2B show a continuous curve, FIG. 3 more accurately illustrates the case of discrete steps as points along the x axis are individually read and processed. The quantization is a function of the scanning and does not change the principles of the invention as described above.

With regard to the amplitude of the periodic screen pattern, optimum results have been found to follow from using a periodic screen pattern with amplitude a factor of 1.5 of full scale. A slightly lower amplitude (such as 1.25) can be used with very small screening ratios (such as 3). Also, it may be desirable to use a slightly larger amplitude for screening ratios of 8 or greater.

The use of an overly large amplitude decreases the image detail reproduced in the final halftone. The use of an amplitude too small results in a greater likelihood that the dots will not be formed at the exact positions indicated by the periodic screen pattern, especially if the hysteresis is not properly tuned. Thus, it can be seen that exact tuning of the hysteresis, combined with the use of the smallest possible amplitude of the periodic screen pattern that still guarantees the accurate positioning of dots, is needed to produce the highest quality halftones with the present invention.

It may also be desirable to add a term to the test value for o(x) consisting of a coefficient multiplied by the input original i(x). Such a term can increase image sharpness and possibly counteract the effects of too large an amplitude of the periodic screen pattern. A typical value for the coefficient, hereafter known as sh, is the amplitude of the screen pattern minus one.

Figure 4:
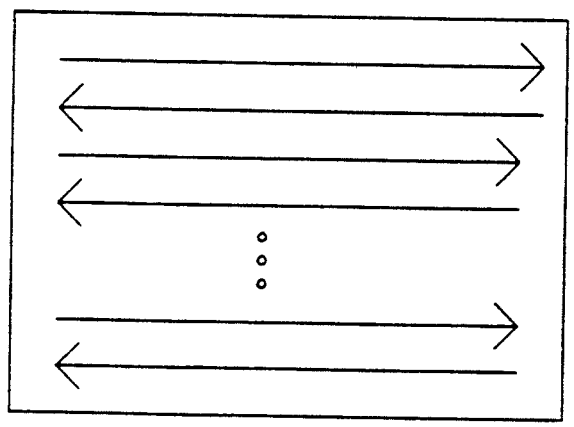
FIG. 4 illustrates scanning according to a serpentine raster procedure.

The invention thus far has been described in a single dimension for purposes of simplifying its illustration. In expanding to a typical two dimensional halftone, the scanning procedure and the distribution of the error must be addressed. One scanning approach is the serpentine raster shown in FIG. 4. Here, scanning of points (or pixels) in the x or horizontal direction takes place first from left to right followed by right to left scanning on the next line down in the y or vertical direction in the frame. Thus, the scanning from the right and left directions alternates between the lines in the vertical direction.

One approach to distributing the error is to allocate half the error in each scanning direction. Thus, for each two dimensional point (x,y) scanned, the point immediately preceding it in the x direction (x−d, where d=+1 or −1 depending on the present left to right or right to left direction of the scan) and the point immediately above it (x, y−1) each are allowed to contribute one half of the error.

Accordingly, in the two dimensional case, the following recurrence relations apply:

$$e'(x,y) = (e(x - d,y) + e(x,y - 1))/2 + i(x,y)$$
$$o(x,y) = 1 \text{ if } (e(x - d,y) + h^* (o(x - d,y) +$$
$$o(x,y - 1)) + S(x,y) + sh * i(x,y) > = 0)$$
$$= 0 \text{ otherwise}$$
$$e(x,y) = e'(x,y) - fs * o(x,y)$$
$$d = -1^y = 1 - 2 * (y \bmod 2)$$

where
   x refers to points or pixels in a scan line,
   y refers to the scan lines,
   i(x, y) and o(x, y) are the input and output arrays, respectively,
   fs is the full scale input value, typically 255 in the case of an eight bit array,
   sh is the coefficient to increase image sharpness,
   S(x,y) is an injected periodic screen pattern, and
   H is an adjustable coarseness value typically of value 0.5 times the value of fs and where larger values of H result in a coarser screen.

It will be appreciated by those of ordinary skill that numerous scanning methods and error distributions are possible and that corresponding equations can be developed for these scanning and error distribution methods which fall within the scope of the invention herein. In addition, several approaches to implementing the screening method according to the invention are possible. These include electronic circuits specifically designed to carry out the method of the invention and software programs which can be stored and executed on special and general purpose computing devices.

HARDWARE EMBODIMENT

Figure 5:
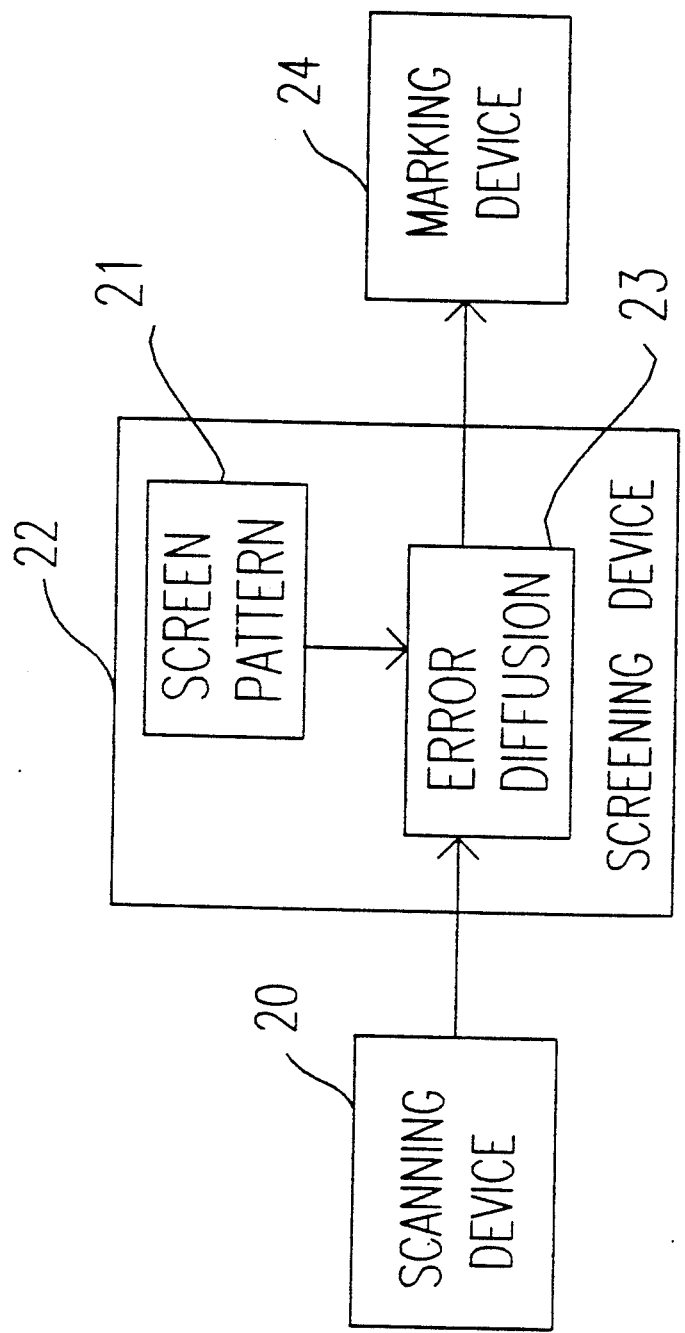
FIG. 5 is a block diagram of a preferred embodiment of the photographic image reproduction system in accordance with the present invention.

FIG. 5 is a block diagram of a preferred embodiment of an image reproduction device, e.g., a photographic image reproduction device, employing the method according to the invention. The photographic reproduction device includes scanning device 20 to measure gray shades of points of an image, convert these measurements to digital form (e.g., 8 bit digital words representing integers from zero to 255) and transmit them to screening device 22, comprising an error diffusion apparatus 23 having an injected screen pattern 21. Screening device 22 processes these data, and generates a screen pattern having only two possible output signals, one corresponding to a black output pixel, and one corresponding to a white output pixel. As previously mentioned, these signals could correspond to marking and not marking a medium for black and white, respectively. In addition, any marking color could be employed. The marking signals from the screening device are transmitted to marking device 24, which marks a medium such as a piece of paper or photographic film accordingly to form a halftone image. It should be noted that, for convenience, in the implementations described below the screening device reads sequences of all the points or pixels on one line of the image, then computes the required errors and outputs and generates the corresponding signals to the marking device before moving on to the next line of the image. Thus, in the flow diagram of FIG. 8 and 8A, the equations show only one subscript x, defining points of the array. The second subscript, y, used in the preceding equations to describe the two dimensional case is accounted for by the line to line scanning. For example, e(x) in the flowchart refers to storing error values for only one line, y, of the array e(x,y) at a time.

Figure 6:
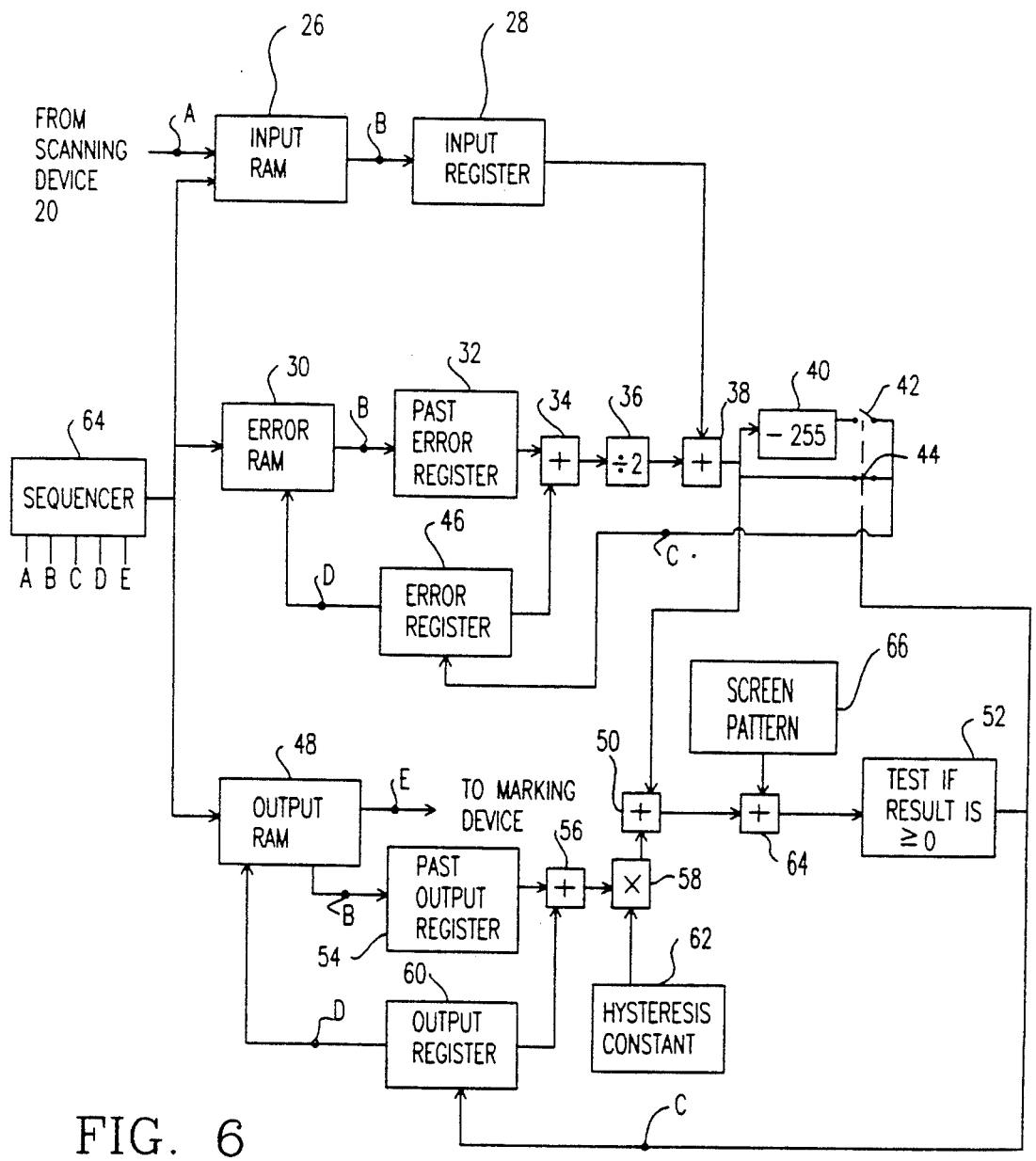
FIG. 6 is a block diagram of the screening device.

FIG. 6 illustrates an implementation of a screening device according to the invention in special purpose electronic circuitry. The circuitry includes an input registers 28, an error register, a past error register 32, an output register 60, and a past output register 54. During the screening processing phase, for each pixel or picture element in the image, the screening processing device carries out the following sequence of operations:

(1) The contents of the error RAM 30, corresponding to the present pixel are read into the past error register 32.

(2) The contents of the output RAM 48, corresponding to the present pixel are read into the past output register 54.

(3) The contents of the input RAM 26 corresponding to the present pixel are read into the input register 28.

(4) The contents of the error register 46 and past error register 32 are added together, as in adder 34, divided by two, for example by shifting right one bit position, as in divider 36 and then added to the contents of the input register 28.

(5) The contents of the output register 60 and past output register 54 are added together, as in adder 56, and multiplied, as shown by multiplier 58 by an adjustable coarseness value or hysteresis constant H, as shown at reference designator 62.

(6) The results of steps 4 and 5 are added together and summed with the output of the screen pattern generator 66. If the result is greater than or equal to zero, then step (7a) below is performed. Otherwise, step (7b) below is performed.

(7a) The constant 1 is stored into output register 60 corresponding to the marking device marking a black dot (output pixel) at the location corresponding to the present pixel. In addition, a constant equal to the value of the input corresponding to black is subtracted from the result of step 4 and stored in error register 46. In a typical case, eight bits are used to represent the input value, so this constant is $2^8-1$, or 255.

(7b) The constant 0 is stored into the output register 60, corresponding to a white dot (output pixel) at the location corresponding to the present pixel. In addition, the result of step 4 is stored in error register 46.

(8) The contents of output register 60 is stored into the output RAM 48 corresponding to the present pixel.

(9) The contents of error register 46 is stored into the error RAM 30 corresponding to the present pixel.

(10) The process is repeated for the next pixel which could either be to the right or to the left of the present pixel, depending on the direction of the scan.

FIG. 6 shows the connections of a circuit which performs the steps outlined above. As shown in FIG. 6, the screening device has a connection to the scanning device 20 that allows data values to be written to an input RAM 26. It will be known to those of ordinary skill that input RAM 26, error RAM 30 and output RAM 48, although shown as separate elements, could be implemented as portions of a single memory device. Another connection from input RAM 26 is used to write a data value read from RAM 26 into input register 28. This activity is triggered by the B output of sequencer 64, as indicated by B on the signal line between input RAM 26 and input register 28.

Error RAM 30 has a connection to past error register 32, which is used to write a data value read from error RAM 30 into past error register 32. This activity is triggered by the B output of sequencer 64, as indicated by B on the signal line between error RAM 30 and past error register 32. An additional connection is used to store in error RAM 30 the contents of error register 46. This activity is triggered by sequencer 64 output D, as indicated by D on the connection between error RAM 30 and error register 46.

The contents of past error register 32 and the contents of error register 46 are added together by adder 34. The result of this operation is divided by two by divider 36. One example of dividing by two is shifting right by one bit position. It will be known to those of ordinary skill that other means of dividing by two are also possible and may be more convenient if, for example, computations are performed in floating point arithmetic. Such approaches are within the scope of the invention described herein. The result of this operation is further added to the contents of input register 28 by adder 38. This result is then carried to three other components, which are constant subtractor 40, switch 44 and adder 50.

Output RAM 48 has a connection to past output register 54, which is used to write a data value read from output RAM 48 into past output register 54. This activity is triggered by the B output of sequencer 64, as indicated by B on the signal line between output RAM 48 and past output register 54. An additional connection is used to store in output RAM 48 the contents of output register 60. This activity is triggered by sequencer 64 output D, as indicated by D on the connection between output RAM 30 and output register 60. A still further connection causes a data value read from output RAM 48 to be sent to the marking device. This activity is triggered by sequencer 64 output E, as indicated by E on the signal line from output RAM 48 to the marking device.

The contents of past output register 54 and the contents of output register 60 are added together by adder 56. This result is then multiplied with the adjustable coarseness value 62 by multiplier 58. The result of this multiplication is then added with the result produced by adder 50 and the result summed with the injected screen pattern 66 in adder 64. The result is then tested for being greater than or equal to zero by tester 52. A connection allows sequencer 64 output C to store the result which is either a 1 or a 0 into output register 60.

Thus, the output register 60 now stores a 1 if the marking device is to mark a black output pixel at the location corresponding to the present input pixel. The constant 0 is stored into the output register 60, if a white pixel (no mark) is to be placed at the location corresponding to the present input pixel.

A constant subtractor 40 stores a constant equal to the value of the input corresponding to black to be subtracted from the error register. In a typical case, eight bits are used to represent the input value, so this constant is $2^8-1$, or 255.

The result from tester 52 is used to switch between the outputs of adder 38 and the constant subtractor 40, the result of which is simply the result of adder 38 from which the constant 255 has been subtracted. If the result from tester 52 is one, then switch 42 will be closed, and a result of constant subtractor 40, triggered by sequencer 64 output C, will be stored in error register 46. If the result of tester 52 is zero, then switch 44 will be closed, and a result of adder 38, again triggered by sequencer 64 output C, will be stored in error register 46.

Upon signaling of sequencer 64 output D, the new output register 60 value is stored in RAM 48, and the new error register 46 value is stored in RAM 30. The entire process is now repeated for the next pixel which could either be to the right or to the left of the present pixel, depending on whether the present line is an even or odd numbered scan line.

FIG. 7 is a tabulation of the signals produced by the sequencer module. As described above, the sequencer 64 in FIG. 6 has the function of controlling the sequencer of operations performed by the screening device circuitry. The sequence module generates the address signals for input RAM 26, error RAM 30, and output RAM 48. The sequencer module operates in three phases.

During the first phase, sequencer module 64 signals its output A, for each pixel in the line, while counting the address up from 0. This has the effect of causing a line of data values from scanning device 20 to be stored in input RAM 26.

During the second phase, the sequencer module will count the address from 0 to n−1, and from n−1 to 0, during alternate invocations of the second phase, where n is understood to be the number of pixels in each scan line. While counting in the second phase, the sequencer module pulses its outputs B, C, and D. Signal B has the effect of loading values from the corresponding RAMs into registers 28, 32, and 54. The loaded values are then processed by the various circuitry discussed above, in order to produce new output and error values. The new output and error values are stored in output register 60 and error register 46, respectively, upon signaling of sequencer 64 output C. Sequencer 64 output D causes the stored values to be finally stored in output RAM 48, and error RAM 30, respectively.

During the third phase, sequencer 64 counts its address from 0 to n−1, while signaling its E output once for each pixel in the line. This has the effect of transmitting the contents of output RAM 48 to marking device 24.

In the circuit of FIG. 5, the one half of the error is distributed to the adjacent pixel horizontally relative to the current pixel, and one half of the error is distributed to the adjacent pixel below the current pixel. Image coarseness is controlled by adjustment of the hysteresis constant which determines how much accumulated error is required to switch from one output color (black or white) to the other. Thus, the error is divided in half. One half of the error was distributed to the next pixel in the serpentine sequence, the other half to the pixel immediately below. Distributing the error one half in each of the vertical and horizontal directions to an adjacent pixel is adequate for higher frequencies (corresponding to a screening ratio up to about 4). However, for the lower frequencies, the distribution of the error is preferably modified so that the error is distributed to more than one pixel in both the vertical and horizontal directions. In the software embodiment of FIG. 8-8A, an infinite impulse response type of filter is used to distribute the error. The circuit of FIG. 6 may also be modified to implement the process of error distribution for this new range of coarseness.

SOFTWARE EMBODIMENT

Figure 8:
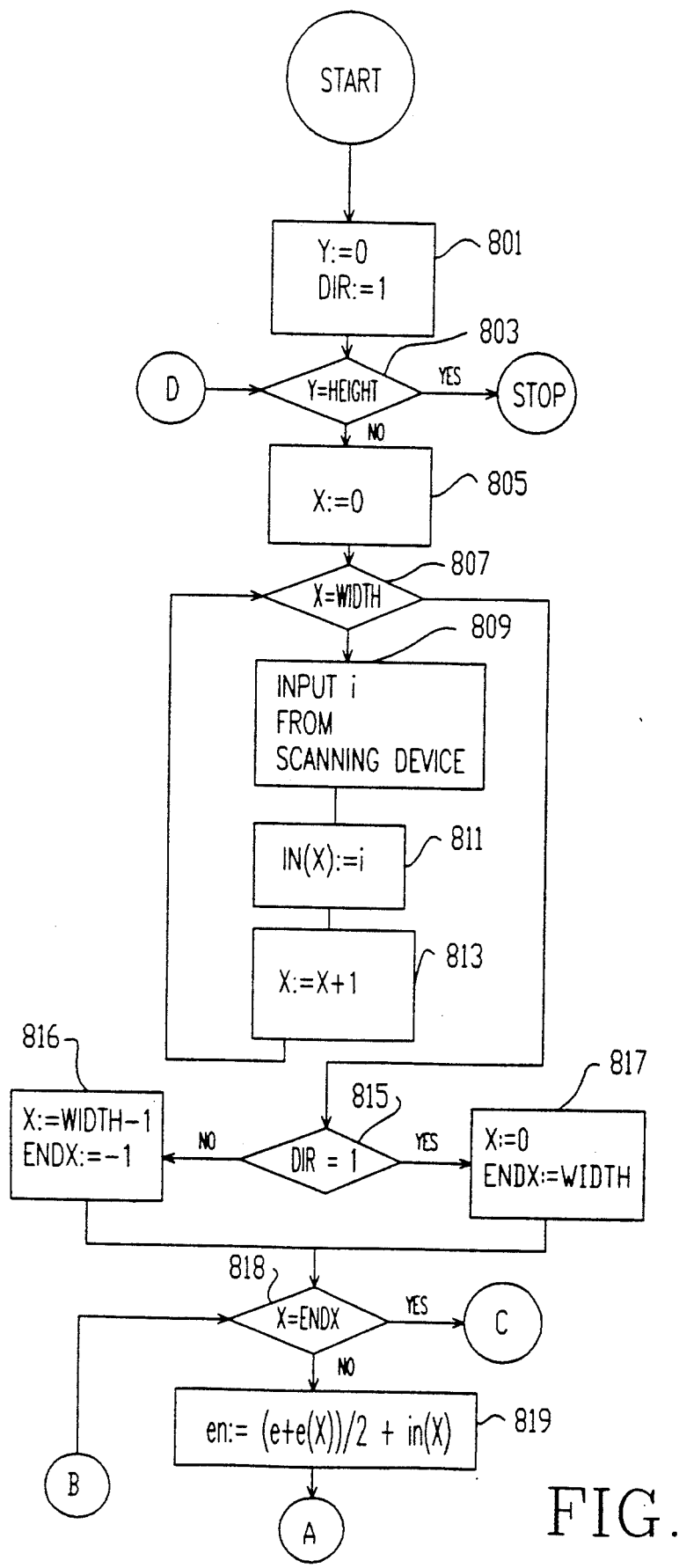
FIGS. 8-8A are a flowchart describing how a general purpose computer is programmed to carry out the functions of the screening device.
Figure 8A:
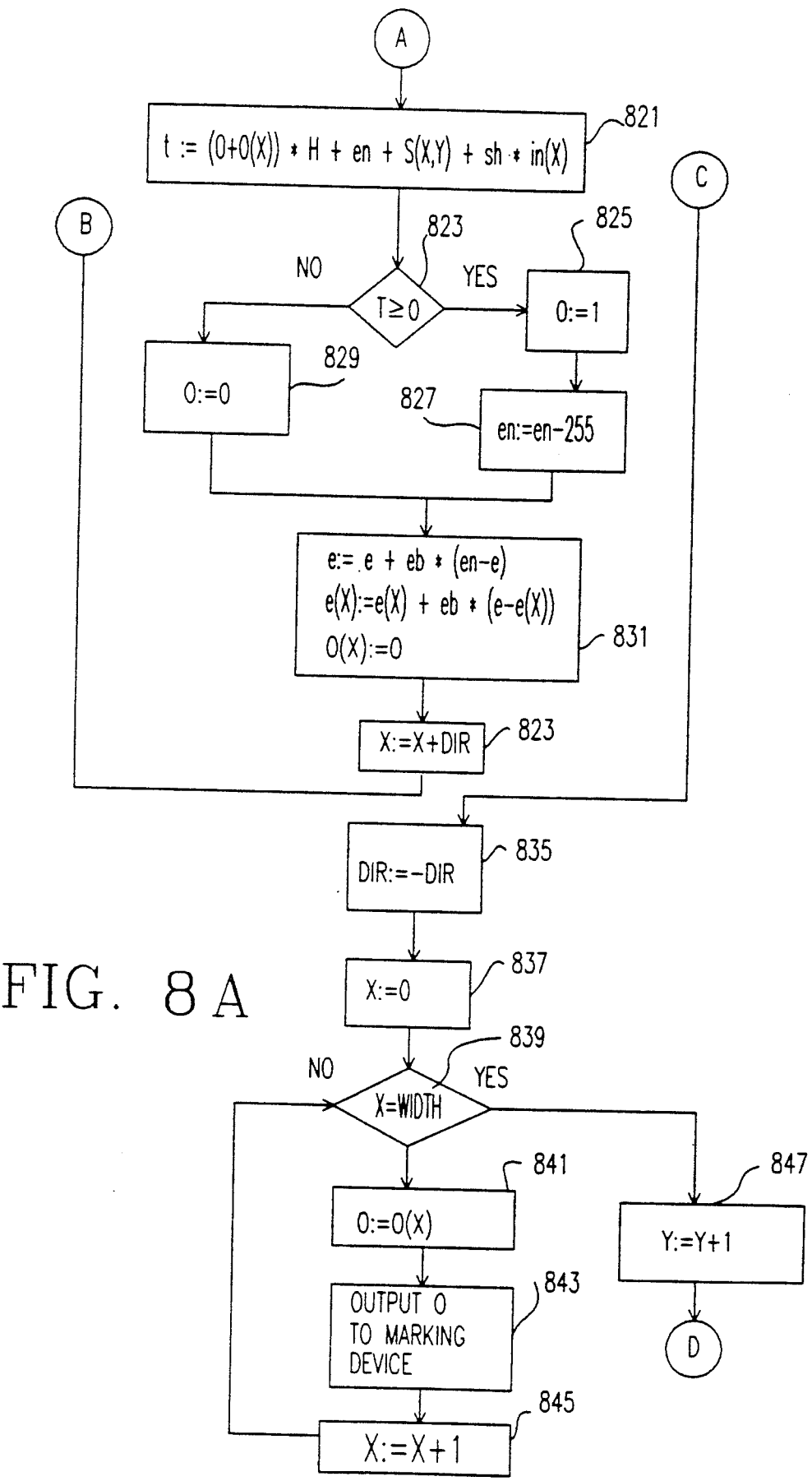

FIGS. 8-8A show a flowchart describing how a general purpose computer can be programmed to carry out the functions of the screening device. Other than the difference in the way the error is diffused to neighboring pixels, will be obvious to those skilled in the art that the flowchart depicted in FIGS. 8-8A is a faithful simulation of the hardware depicted in FIG. 6 and FIG. 7. The flowchart can be implemented by software which can be run on a general purpose computer.

It should be noted that the flow diagram in FIGS. 8 and 8A also illustrate that an entire line is scanned by the scanning device before the screening process takes place. Thus, as previously discussed, it is not necessary in the equations to show a second subscript, y, since this is accounted for in the implementation which operates on an entire scan line before moving on to the next line. In function block 801, the top line is designated as line zero and scanning from left to right is designated by setting variable dir equal to one. In function block 803, the current value of the line number Y is tested to determine if all the lines of the image have been processed and further processing can be stopped. If not, the horizontal variable X is set equal to zero in function block 805. In function block 807 the current value of X is tested to determine if all the points i(x) on line Y have been read. If not, in function block 809 an input is received from the scanning device and in function block 811 the measured value in(x) at point x is stored and X is incremented, as shown in block 813. These steps are repeated until the entire line has been read.

Upon completion of reading the line, screen processing begins. The direction of the scan is tested as shown in block 815. If the direction is 1, indicating the left to right portion of the scan, X is set equal to zero and a variable endX is set equal to the width of the frame. Otherwise, in block 816, X is set equal to width minus one and endX is set equal to negative one. As shown in block 817, if the end of the scan line has not been reached in this phase of the processing, as indicated by the value of X not being equal to endX, as shown in block 818, the recursive relationships previously discussed (now without needing the second subscripts) are applied in blocks 819 and 821. Function block 821 shows a temporary variable T representing an intermediate value which can be stored in a register. In step 821, S(X,Y) represents the output of the screen pattern generator at point (X,Y). The sh parameter allows enhancement of image sharpness. The quality range of screening ratios can be expanded by the error distribution method including steps 819 and 821. In step 831, the parameter eb controls, along with H, the coarseness of the halftone. New reaches of coarseness are thereby opened to just distributing (diffusing) the error in two directions. For example, a screening ratio of about 8 corresponds to the setting eb=0.6 and H=0.5. A value of eb=1.0 corresponds to the old case. Excellent quality is obtained now for screening ratios in the range of 3 through 8.

In function block 823, if T is greater than or equal to zero, the output O is set equal to one and the error is set equal to the error minus 255, where 255 represents full scale output, i.e., black, as shown in function blocks 825 and 827. Otherwise the output O is set equal to zero, as shown in function block 829. It will be clear to those of ordinary skill that the variable T and any corresponding temporary storage register can be eliminated by consolidating steps 821 and 823 into a single step. e(x) and o(x) are next set equal to the error and 0 respectively in block 831. X is incremented in block 833 and the process repeats until the line is completed.

When processing of the line is completed, processing to provide output signals for the line to the marking device can take place. Variable dir is negated, as shown in block 835. X is again set equal to zero in block 837 and tested in block 839 to determine if all the values for the scan line have been reported to the marking device. If not, O is set equal to o(x) in block 841, O is output to the marking device in block 843 and X is incremented as shown in block 845. When testing in block 839 indicates that the entire scan line has been output to the marking device, the scan line is incremented, as shown in block 847. As previously discussed, function block 803 directs processing of the next line according to the same steps until all lines are exhausted. Thus, scanning, screening and output to the marking device is completed for each scan line before the next scan line is read.

For purposes of understanding the operation of present invention, a partial analogy to woodwind musical instruments may be useful. A woodwind musical instrument consists of a reed and a resonating bore. The reed without the bore produces a range of frequencies. The resonating bore selects a single preferred frequency, and forces the reed to oscillate at that frequency. The forcing only works if the approximate free running frequency of the reed is close to the resonant frequency of the bore. Thus, in order to produce a high quality musical tone, the musician must both select the desired bore frequency by means of fingering, and tune the frequency of the reed to approximately the same frequency, by means of embouchure. The reed corresponds to the regular pattern produced by error diffusion. The resonating bore corresponds to the injected screen pattern. Control of the reed corresponds to adjustment of the error diffusion dot formation frequency.

In the present invention, the frequency of error diffusion dot formation is controlled by adjustment of the hysteresis constant. The center of the distribution of spatial frequencies is the approximate frequency of oscillation, i.e. the average coarseness of the dot pattern. Adding a periodic screen pattern forces the oscillation to the frequency of the periodic screen pattern. Then, the spatial frequency content of the final halftone is contained in a sharp peak at the frequency of the periodic screen pattern. Dot formation is forced to the frequency of the periodic screen pattern if the free running approximate frequency of the original oscillator is close to the frequency of the periodic screen pattern. The result is a halftone consisting of dots placed on a grid pattern at exactly the same frequency as the periodic screen pattern. The coarseness of the error diffusion halftone dot pattern must be close to the desired frequency of the periodic screen pattern in order for well defined dots to form in the final halftone.

One minor difference in the analogy is that the resonating bore of the woodwind only controls the frequency of the oscillation of the reed, but not its phase. In the present invention, the periodic screen pattern determines both the spatial frequency and the phase (i.e. absolute positioning of the dots) in the final halftone. Thus, when using the present invention in multicolor printing, it is possible to control the rosette patterns that result from overlapping dots. For example, assume that the periodic screen pattern for the black color plane has already been determined. Then, the periodic screen patterns for the cyan and magenta color planes are determined from the black periodic screen pattern by a rotation of plus and minus 30 degrees, respectively. If the center of the rotations correspond to the center of a black dot, then the resulting multicolor image will exhibit dot centered rosettes. If the center of the rotations correspond to the center of a white dot on a black field (i.e. a negative black dot), then the resulting multicolor image will exhibit clear centered rosettes. Clear centered rosettes are preferred by many, as providing smoother patterns in the highlight areas of a photograph.

What is claimed is:

1. A method of producing a halftone image comprising:
    scanning a plurality of input pixels of an original image and generating a numerical value representing a shade of gray for each input pixel scanned;
    generating output pixels forming halftone dots from said input pixels by error diffusion, wherein the error between an input pixel and an output pixel is distributed to at least one adjacent pixel;
    generating a periodic screen pattern;
    adjusting a frequency so that the frequency of said halftone dots and the frequency of said periodic screen pattern are substantially equal; and
    combining said periodic screen pattern with said halftone dots so as to lock the frequency of said halftone dots to substantially equal the frequency of said periodic screen pattern.

2. A method in accordance with claim 1, wherein said step of adjusting a frequency comprises adjusting the frequency of said halftone dots to be substantially equal to the frequency of said periodic screen pattern.

3. A method in accordance with claim 1, wherein said step of adjusting a frequency comprises adjusting the frequency of said periodic screen pattern to be substantially equal to the frequency of said halftone dots.

4. A method in accordance with claim 1, wherein said step of combining said periodic screen pattern with said halftone dots substantially locks the phase of said halftone dots to the phase of said periodic screen pattern.

5. An apparatus for producing a halftone image comprising:
    means for scanning a plurality of input pixels of an original image and generating a numerical value representing a shade of gray for each input pixel scanned;
    means for generating output pixels forming halftone dots from said input pixels by error diffusion, wherein the error between an input pixel and an output pixel is distributed to at least one adjacent pixel;
    means for generating a periodic screen pattern;
    means for adjusting a frequency so that the frequency of said halftone dots and the frequency of said periodic screen pattern are substantially equal; and
    means for combining said periodic screen pattern with said halftone dots so as to lock the frequency of said halftone dots to substantially equal the frequency of said periodic screen pattern.

6. An apparatus in accordance with claim 5, wherein said means for adjusting a frequency comprises means for adjusting the frequency of said halftone dots to be substantially equal to the frequency of said periodic screen pattern.

7. An apparatus in accordance with claim 5, wherein said means for adjusting a frequency comprises means for adjusting the frequency of said periodic screen pattern to be substantially equal to the frequency of said halftone dots.

8. An apparatus in accordance with claim 5, wherein said means for combining said periodic screen pattern with said halftone dots includes means for substantially locking the phase of said halftone dots to the phase of said periodic screen pattern.

9. An image reproducing system, comprising:
    a) a scanning means for reading input image data corresponding to the image to be reproduced;
    b) a screening device comprising:
        memory means for storing the input image data as gray scale values for sequences of pluralities of input points, and for storing a plurality of binary output signals which direct a marking device to mark and not mark indicia on a medium;
        means for generating a periodic screen pattern;
        means for generating signals forming halftone dots, said signals allocating the marking and not marking of the indicia on the medium based on said periodic screen pattern, a value of a current input point in a sequence of input points, a previous output signal corresponding to a previous input point in the sequence and an error representing a difference between the input points and the output signals scaled relative to a maximum gray scale, the error influencing output signals for subsequent input points in the sequence, said error being distributed to at least one adjacent pixel;
        adjusting a frequency so that the frequency of said halftone dots and the frequency of said periodic screen pattern are substantially equal; and
    c) a marking device to receive the output signals from the screening device, whereby the marking device marks variable size dots comprising indicia corresponding to said output signals.

10. The apparatus recited in claim 9, wherein the scanning device scans a plurality of lines corresponding to the image and the sequence corresponds to a plurality of points on at least one line.

11. A method for reproducing a photographic image comprising the steps of:
    scanning a plurality of input points of an original image for reading input image data corresponding to the input pixels of the image to be reproduced;
    generating a periodic screen pattern;
    for a present input pixel, adding an error value previously generated for a first pixel adjacent in a first scanning direction to the present input pixel with an error value generated for a second pixel adjacent to the present input pixel in a second scanning direction orthogonal to the first scanning direction and creating a first result;
    dividing said first result by two and creating a second result;

adding an input data to said second result creating a third result;

adding an output value previously generated for the first pixel with an output value previously generated for the second pixel to create a fourth result;

multiplying said fourth result by a hysteresis constant to create a fifth result;

adding said periodic pattern and said fifth result to said third result to create a sixth result;

storing a seventh result of 1 if said sixth result is not less than zero and if said sixth result is less than zero storing a seventh result of 0;

multiplying said seventh result by a constant creating an eighth result;

subtracting said eighth result from said third result to create a present error value and marking indicia on an output medium in accordance with said seventh result.

12. A photographic image reproducing system comprising:

a scanning device receiving an input array i(x,y) corresponding to an original image to be reproduced, wherein x and y represent scanning directions;

means for receiving a periodic screen pattern a marking device receiving output signals o(x,y) from a screening device for marking indicia on an output medium in accordance with said output signals o(x,y); the screening device using said input array i(x,y) in a recurrence relation calculation means, the recurrence relation being:

$$e'(x,y) = (e(x - d,y) + e(x,y - 1))/2 + i(x,y); \quad (a)$$
$$o(x,y) = 1 \text{ if } (e'(x,y) + H^* (o(x - d,y) + o(x,y - 1)) + S(x,y) + sh * i(x,y) > = 0); \quad (b)$$
$$= 0 \text{ otherwise}$$
$$e(x,y) = e'(x,y) - fs * o(x,y); \text{ and} \quad (c)$$
$$d = -1^y = 1 - 2 * (y \bmod 2); \quad (d)$$

wherein o(x,y) is an output array, fs is a maximum allowable value of members of said array i (x,y), sh is the coefficient for image sharpness enhancement, H is a hysteresis constant; and S(x,y) is said periodic screen pattern.

13. A photographic image reproducing system as recited in claim 12 wherein:

e(x, −1)=0;
e(−1,y)=0;.
e (width, y)=0;
o(x,−1)=0;
o(−1,y)=0; and
o(width,y)=0.

14. A method of producing a halftone image comprising the steps of:

scanning a plurality of input points of an original image and generating a numerical value representing a shade of gray for each input point scanned;

receiving a periodic screen pattern;

outputting a screened image forming halftone dots, each of said halftone dots having a plurality of dots, each dot of said plurality of dots being one of black or white, the size of each plurality of dots being determined form a recursive relationship between said periodic screen pattern, a value of a current input point, a previous output, and an error representing a difference between a value of a previous input point and the previous output, said error being distributed to at least one adjacent pixel;

adjusting a frequency so that the frequency of said halftone dots and the frequency of said periodic screen pattern are substantially equal; and transmitting signals representing the screened image to a marking device for marking on an output medium.

15. The method recited in claim 14, wherein the recursive relationship employs a hysteresis constant, the hysteresis constant determining the coarseness of the screened image.

16. The method recited in claim 15, wherein the hysteresis constant defines an allowable excursion of the error around zero.

17. The method recited in claim 14, wherein the scanning is performed in two dimensions.

18. The method recited in claim 14, wherein the error is allocated in two dimensions.

19. The method recited in claim 18, wherein the error is allocated equally in each of the two dimensions.

20. The method recited in claim 14, wherein the black dots and white dots are produced by marking and not marking the medium, respectively.

21. A method of producing a halftone image comprising the steps of:

scanning a plurality of input points of an original image and generating a numerical value representing a shade of gray for each input point scanned;

receiving a periodic screen pattern;

outputting a screened image having a plurality of dots, each dot of said plurality of dots being one of black or white, the size of each plurality of dots being determined form a recursive relationship between said periodic screen pattern, a value of a current input point previous output, and an error representing a difference between a value of a previous input point and the previous output; and transmitting signals representing the screened image to a marking device for marking on an output medium, wherein the recursive relationship is defined as:

$$e'(x,y) = (e(x - d,y) + e(x,y - 1))/2 + i(x,y)$$
$$o(x,y) = 1 \text{ if } (e(x - d,y) + H^* (o(x - d,y) + o(x,y - 1)) + S(x,y) + sh * i(x,y) > = 0)$$
$$= 0 \text{ otherwise}$$
$$e(x,y) = e'(x,y) - fs * o(x,y)$$
$$d = -1^y = 1 - 2 * (y \bmod 2)$$

where x refers to pixels in a scan line, y refers to the scan lines, i(x, y) and o(x, y) are the input and output arrays, respectively, fs is the full scale input value, typically 255 in the case of an eight bit array, sh is the coefficient for image sharpness enhancement, H is a hysteresis constant typically of value 0.5 times the value of fs and where larger values of H result in a coarser screen, and S(x,y) is said periodic screen pattern.

22. The method in claim 21, wherein fs is a value representing a maximum gray shade and h is a product of fs and a number not less than zero.

23. An apparatus for producing a halftone image comprising:

means for scanning a plurality of input points of an original image and generating a numerical value representing a shade of gray for each input point scanned;

means for receiving a periodic screen pattern;

means for outputting a screened image forming halftone dots, each of said halftone dots having a plurality of dots, each dot of said plurality of dots being one of black or white, the size of each plurality of dots being determined form a recursive relationship between said periodic screen pattern, a value of a current input point, a previous output, and an error representing a difference between a value of a previous input point and the previous output, said error being distributed to at least one adjacent pixel;

adjusting a frequency so that the frequency of said halftone dots and the frequency of said periodic screen pattern are substantially equal; and means for transmitting signals representing the screened image to a marking device for marking on an output medium.

24. The apparatus recited in claim 23, wherein the recursive relationship employs a hysteresis constant, the hysteresis constant determining the coarseness of the screened image.

25. The apparatus recited in claim 24, wherein the hysteresis constant defines an allowable excursion of the error around zero.

26. The apparatus recited in claim 23, wherein the scanning is performed in two dimensions.

27. The apparatus recited in claim 23, wherein the error is allocated in two dimensions.

28. The apparatus recited in claim 27, wherein the error is allocated equally in each of the two dimensions.

29. The apparatus recited in claim 23, wherein the black and white dots correspond to marking and not marking the output medium, respectively.

30. An apparatus for producing a halftone image comprising:

means for scanning a plurality of input points of an original image and generating a numerical value representing a shade of gray for each input point scanned;

means for receiving a periodic screen pattern;

means for outputting a screened image having a plurality of dots, each dot of said plurality of dots being one of black or white, the size of each plurality of dots being determined from a recursive relationship between said periodic screen pattern, a value of a current input point, a previous output, and an error representing a difference between a value of a previous input point and the previous output; and means for transmitting signals representing the screened image to a marking device for marking on an output medium wherein the recursive relationship is defined as:

$$e'(x,y) = (e(x - d,y) + e(x,y - 1))/2 + i(x,y)$$
$$o(x,y) = \text{if } (e(x - d,y) + H*(o(x - d,y) + o(x,y - 1)) + S(x,y) + sh * i(x,y) > = 0)$$
$$= 0 \text{ otherwise}$$
$$e(x,y) = e'(x,y) - fs * o(x,y)$$
$$d = -1^y = 1 - 2 * (y \bmod 2)$$

where x refers to pixels in a scan line, y refers to the scan lines, i(x, y) and o(x, y) are the input and output arrays, respectively, fs is the full scale input value, typically 255 in the case of an eight bit array, sh is the coefficient for image sharpness enhancement, H is a hysteresis constant typically of value 0.5 times the value of fs and where larger values of H result in a coarser screen, and S(x,y) is said periodic screen pattern.

31. The apparatus recited in claim 30, wherein fs is a value representing a maximum gray shade and H is a product of fs and a number not less than zero.

32. An apparatus for reproducing a photographic image comprising:

means for scanning a plurality of input points of an original image for reading input image data corresponding to the input pixels of the image to be reproduced;

means for generating a periodic screen pattern;

means for isolating a present input pixel and adding an error value previously generated for a first pixel adjacent in a first scanning direction to the present input pixel with an error value generated for a second pixel adjacent to the present input pixel in a second scanning direction orthogonal to the first scanning direction and creating a first result;

means for dividing said first result by two and creating a second result;

means for adding an input data to said second result creating a third result;

means for adding an output value previously generated for the first pixel with an output value previously generated for the second pixel to create a fourth result;

means for multiplying said fourth result by a hysteresis constant to create a fifth result;

means for adding said periodic pattern and said fifth result to said third result to create a sixth result;

means for storing a seventh result of 1 if said sixth result is not less than zero and if said sixth result is less than zero storing a seventh result of 0;

means for multiplying said seventh result by a constant creating an eighth result;

means for subtracting said eighth result from said third result to create a present error value and means for marking indicia on an output medium in accordance with said seventh result.

33. An image reproducing system for generating on an output medium an image corresponding to an original image, the system comprising:

a) a scanning means for reading input data of the original image to be reproduced, the scanning means generating signals representing gray scale values corresponding to each pixel of the original;

b) a screening device comprising:

memory means for storing the image data corresponding to each pixel and a plurality of output signals which direct a marking device to mark one of black or white indicia on the output medium for each output signal, each output signal corresponding to a pixel on the output medium;

means for generating a periodic screen pattern;

means for generating signals allocating the black or white indicia on the output medium based on said periodic screen pattern, the gray scale value of a current gray scale signal, a previous output signal and an error signal representing a difference between the current gray scale signals and at least one previously generated output signal;

c) a marking device to receive the output signals from the screening device, the marking device thereby generating variable size dots comprising indicia corresponding to the output signals.

34. The apparatus recited in claim 33, wherein the black and white indicia correspond to marking and not marking of the output medium, respectively.

* * * * *